( 12 ) United States Patent
Kiyosawa et al.

(10) Patent No.: US 7,905,326 B2
(45) Date of Patent: Mar. 15, 2011

(54) METHOD FOR LUBRICATING WAVE REDUCTION GEAR, AND ROTATING TABLE DEVICE

(75) Inventors: Yoshihide Kiyosawa, Nagano-ken (JP); Hiroki Hanaoka, Nagano-ken (JP); Hiroshi Yamazaki, Nagano-ken (JP)

(73) Assignee: Harmonic Drive Systems Inc., Tokyo (JP)

( * ) Notice: Subject to any disclaimer, the term of this patent is extended or adjusted under 35 U.S.C. 154(b) by 538 days.

(21) Appl. No.: 12/070,180

(22) Filed: Feb. 15, 2008

(65) Prior Publication Data

US 2008/0245172 A1   Oct. 9, 2008

(30) Foreign Application Priority Data

Mar. 8, 2007   (JP) .................................. 2007-059156

(51) Int. Cl.
   *F16H 57/04*      (2010.01)
   *F16H 33/04*      (2010.01)
   *F16N 7/36*       (2006.01)
(52) U.S. Cl. ............ 184/6.12; 74/640; 74/467; 175/159
(58) Field of Classification Search .................. 184/6.12, 184/26; 475/159; 74/467, 640
   See application file for complete search history.

(56) References Cited

U.S. PATENT DOCUMENTS

| 4,742,729 | A | * | 5/1988 | Cordara ........................... 74/640 |
| 5,984,048 | A | * | 11/1999 | Kiyosawa et al. ........... 184/6.12 |
| 6,672,181 | B2 | * | 1/2004 | Kobayashi ...................... 74/640 |
| 7,484,436 | B2 | * | 2/2009 | Kiyosawa ....................... 74/640 |
| 2007/0157760 | A1 | * | 7/2007 | Kiyosawa ....................... 74/640 |

FOREIGN PATENT DOCUMENTS

| JP | 09-250609 | 9/1997 |
| JP | 09-250610 | 9/1997 |
| JP | 09-250611 | 9/1997 |

* cited by examiner

*Primary Examiner* — Michael R Mansen
*Assistant Examiner* — Robert T Reese
(74) *Attorney, Agent, or Firm* — Flynn, Thiel, Boutell & Tanis, P.C.

(57) ABSTRACT

A wave reduction gear (5) is disposed inside a device case (2) of a rotating table device (1). Lubrication oil is sprayed from an oil supply channel (22), which is formed in the device case (2), toward an oil supply hole (22) formed in a cup-shaped flexible externally toothed gear (12). A wave bearing (19) disposed in the interior is lubricated via the oil supply hole (21). Lubricating oil that has entered into the flexible externally toothed gear (12) is forcibly suctioned to the exterior via an oil recovery channel (23) that is formed in the device case (2). Accordingly, it will be possible to prevent oil from being suctioned due to the negative pressure state in the interior of the flexible externally toothed gear accompanying the high-speed rotation, and regions of the wave bearing (19) can be reliably lubricated.

4 Claims, 4 Drawing Sheets

METHOD FOR LUBRICATING WAVE REDUCTION GEAR, AND ROTATING TABLE DEVICE

TECHNICAL FIELD

The present invention relates to a lubrication method for supplying lubricating oil from the exterior to a portion that is to be lubricated in a wave reduction gear installed in a device case, and to a rotating table device that uses the lubrication method.

BACKGROUND ART

Wave reduction gears are used in rotating table devices in gear-cutting machines and a variety of other machine tools. This wave reduction gear has a small number of components, and can carry out positioning with a high degree of precision. One known type of wave reduction gear is a cup-type wave reduction gear comprising an annular rigid internally toothed gear, a cup-shaped flexible externally toothed gear disposed therein, and a wave generator fitted inside the externally toothed gear. The cup-shaped flexible external gear has a cylindrical trunk portion, a diaphragm and boss for sealing off one end of the cylindrical trunk portion, and external teeth formed in a portion of an external peripheral surface of the other open end of the cylindrical trunk portion. The wave generator is fitted in an open end portion of the cylindrical trunk portion where the external teeth are formed on an outer peripheral surface thereof.

A wave reduction gear provided with lubricating mechanism is disclosed in Patent Documents 1 through 3.

[Patent Document 1] Japanese Laid-open Patent Application No. 09-250610
[Patent Document 2] Japanese Laid-open Patent Application No. 09-250609
[Patent Document 3] Japanese Laid-open Patent Application No. 09-250611

Oil bath lubrication is generally used in a case where a wave reduction gear having this structure is used in high-speed rotation. In this case, problems arise in that the motor load increases due to the viscosity resistance of the lubricating oil. Another problem known as lubrication oil suction occurs when the wave generator is rotated at high speeds by the motor, causing negative pressure inside the flexible externally toothed gear. Lubricating oil is thereby suctioned into the externally toothed gear, and an adequate amount of lubricating oil is not supplied to the bearing components of the wave generator.

DISCLOSURE OF THE INVENTION

An object of the present invention is to proposes a method for lubricating a wave reduction gear in which lubricating oil can be reliably supplied from the exterior to components that require lubrication in an in-built wave reduction gear.

In order to solve the problems described above, the present invention proposes a method for lubricating a wave reduction gear, wherein lubricating oil is supplied to bearing components of a wave generator fitted inside a cup-shaped flexible externally toothed gear in a wave reduction gear disposed in a device case, and portions where the flexible externally toothed gear and a rigid internally toothed gear are enmeshed. The lubricating method is characterized in comprising: forming at least one oil supply hole in a region of at least one of a cylindrical trunk part of the flexible externally toothed gear, and a diaphragm that defines a bottom part thereof; spraying lubricating oil, which has been introduced from exterior of the device case, toward the region of the flexible externally toothed gear in which the lubricating oil supply hole is formed; forcibly introducing lubricating oil into the flexible externally toothed gear via the oil supply hole; and supplying the lubricating oil that has been forcibly introduced into the flexible externally toothed gear to the bearing components of the wave generator that is fitted in an open end part of the flexible externally toothed gear.

Lubricating oil introduced into the device case is preferably forcibly suctioned toward the open end of the flexible externally toothed gear. Lubricating oil in the flexible externally toothed gear is preferably forcibly supplied to the bearing components of the wave generator, and lubricating oil, which has not entered the flexible externally toothed gear, is preferably forcibly supplied from the oil supply hole to the meshing portion of the flexible externally toothed gear and the rigid internally toothed gear. Lubricating oil that has been forcibly suctioned through the bearing components and the meshing portions is preferably recovered to the exterior of the device case.

The present invention is directed to a flexible externally toothed gear in a wave reduction gear used in the above-mentioned lubrication method, characterized in comprising a cylindrical trunk part; a diaphragm that extends from one end of the cylindrical trunk part inward in a radial direction; and external teeth formed in an outer peripheral surface portion of the other open end of the cylindrical trunk part. At least one through-hole used for supplying oil is formed in a region of at least one of the cylindrical trunk part and the diaphragm.

A rotating table device of the present invention is characterized in comprising:
a device case;
a rotating table rotatably supported on the device case; and
a wave gear device, which rotates and drives the rotating table, and which is disposed in an interior space enclosed by the device case and the rotating table; wherein
the wave gear device has a rigid internally toothed gear, which is fixed to the drive case; a cup-shaped flexible externally toothed gear, which is coaxially connected to the rotating table; and a wave generator, which is fitted in an open end part of the flexible externally toothed gear;
the flexible externally toothed gear has at least one oil supply hole formed in a region of at least one of a cylindrical trunk part of the flexible gear, and a diaphragm that defines a bottom surface portion of the flexible gear; and
the device case has an oil supply channel for introducing lubricating oil from the exterior of the device case, and spraying the lubricating oil toward the region of the flexible externally toothed gear in which the oil supply hole is formed; and an oil recovery channel for forcibly suctioning the lubricating oil toward the open end of the flexible externally toothed gear, and recovering the lubricating oil to the exterior of the device case.

In the present invention, lubricating oil that has been introduced from exterior of the device case is sprayed toward the oil supply hole of the flexible externally toothed gear in the inbuilt wave reduction gear. The flexible externally toothed gear rotates, the oil supply hole formed therein also rotates, and some of the lubricating oil sprayed toward the oil supply hole is forcibly introduced to the interior of the flexible externally toothed gear via the oil supply hole. Bearing components of the wave generator fitted inside the flexible externally toothed gear are lubricated by the lubricating oil introduced to the interior of the flexible externally toothed gear. Lubricating oil that has not entered the oil supply hole is supplied to the portions where the flexible externally toothed gear and the rigid internally toothed gear mesh, and these portions are lubricated.

Furthermore, the lubricating oil is forcibly suctioned toward the open end of the flexible externally toothed gear, whereby the lubricating oil is forcibly suctioned through the bearing parts and the meshing parts, and recovered on the exterior of the device case. Lubricating oil is forcibly suctioned from the interior of the flexible externally toothed gear, thereby making it possible to prevent the lubricating oil from being suctioned up, which occurs as a result of a negative pressure state established inside the flexible externally toothed gear during rotation.

Powder is generated from parts of the mechanism due to wear when the wave reduction gear is initially operated. However, the lubricating oil is circulated and recovered on the exterior, allowing the powder generated as a result of wear to be flushed out by the lubricating oil, and recovered on the exterior. Accordingly, it is possible to prevent powder generated as a result of wear from damaging, e.g., the sliding parts and bearings of the wave reduction gear.

If a rotating table device in which a wave reduction gear is used at high-speed rotation is adopted in the lubrication method of the present invention, it will be possible to effectively prevent lubricating oil from being suctioned due to the negative pressure state in the interior of the flexible externally toothed gear accompanying the high-speed rotation. Accordingly, lubricating oil can be more reliably and adequately supplied to parts to be lubricated in a wave reduction gear than in a case in which oil bath lubrication is used.

BEST MODE FOR CARRYING OUT THE INVENTION

Embodiments of a rotating table device in which the present invention is used will be described below with reference to the drawings.

Embodiment 1

Figure 1:
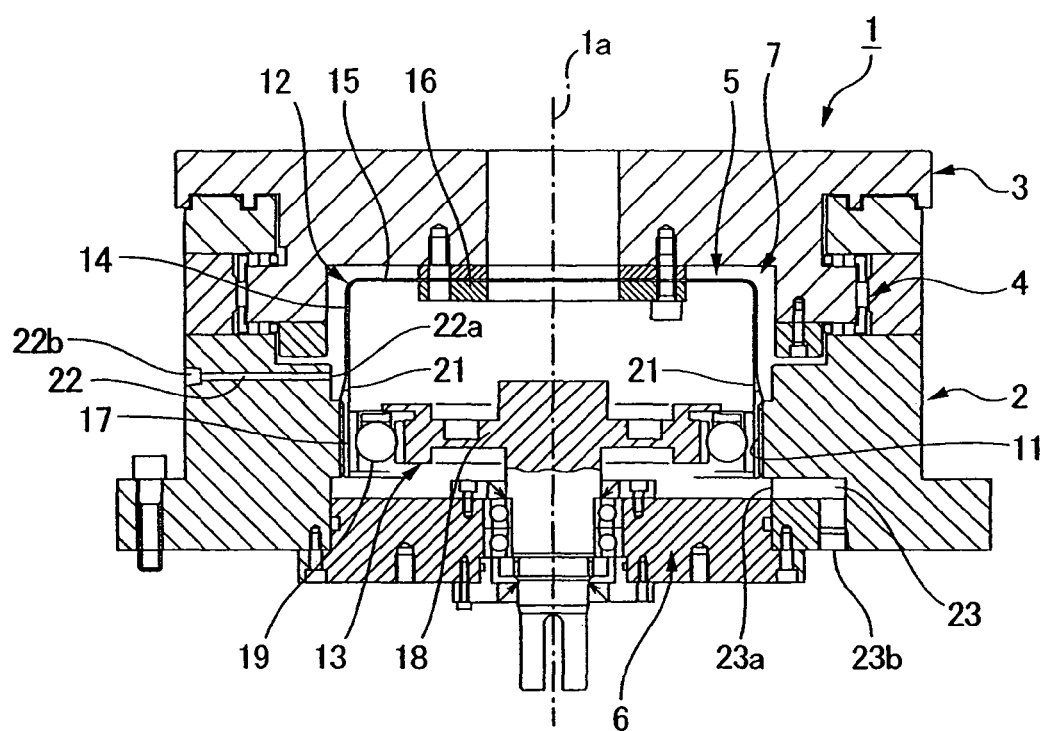
FIG. 1 is a longitudinal sectional view showing a rotating table device according to Embodiment 1 of the present invention.

FIG. 1 is a longitudinal sectional view showing a rotating table device according to Embodiment 1. The rotating table device 1 comprises a device case 2; a rotating table 3 that is rotatably supported in a coaxial state on top of the device case 2; a bearing mechanism 4 disposed between the rotating table 3 and the device case 2 in order to rotatably support the rotating table on the device case; and a wave reduction gear 5 for rotatably driving the rotating table 3 around a center axis line 1a. The wave reduction gear 5 is connected to a motor or another rotation drive source (not shown).

The device case 2 has a cylindrical shape and has openings in upper and lower ends. The upper end opening part is sealed off by the rotating table 3, and the lower end opening part is sealed off by a disc-shaped flange 6. The cup-shaped wave reduction gear 5 is disposed in a state facing the vertical direction in an internal space 7, which is enclosed by the device case 2, the rotating table 3, and the disc-shaped flange 6.

The wave reduction gear 5 comprises internal teeth 11 integrally formed with the device case 2; a cup-shaped flexible externally toothed gear 12; and a wave generator 13. The flexible externally toothed gear 12 has a cylindrical trunk part 14; a diaphragm 15 that is connected to an upper end of the cylindrical trunk part and that widens toward the interior in the radial direction; an annular boss 16 which is connected to an inner peripheral edge of the diaphragm 15; and external teeth 17 formed in the external surface portion of the upper opening part of the cylindrical trunk part 14.

The wave generator 13 has, e.g., a rigid cam plate 18 whose outline forms an ellipse; and a wave bearing 19 installed on the outer peripheral surface of the rigid cam plate. The wave bearing 19 is a ball bearing comprising a flexible outer race and inner race. The wave generator 13 is fitted in the flexible externally toothed gear 12 so as to seal off the open end of the flexible externally toothed gear 12. The portion of the flexible externally toothed gear 12 in which the external teeth 17 are formed is elliptically flexed by the wave generator 13, and the portion of the external teeth 17 positioned on either end of the major axis of the ellipse mesh with portions that correspond to the internal teeth 11. When the wave generator 13 is caused to rotate by a motor or the like, the locations where the teeth 11, 17 are enmeshed will move in a circumferential direction, and reduced rotation according to the difference between the number of teeth 11 and teeth 17 is obtained from the flexible externally toothed gear 12. The boss 16 of the flexible externally toothed gear 12 is coaxially connected and fixed to the rotating table 3, and the rotating table 3 is rotated and driven by the flexible externally toothed gear 12.

Figure 2A:
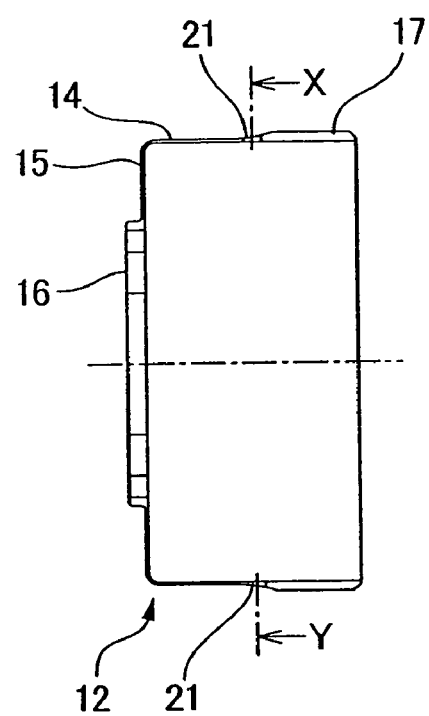
FIGS. 2A and 2B are a longitudinal sectional view and a cross sectional view showing the flexible externally toothed gear of the wave reduction gear installed in the rotating table device in FIG. 1.
Figure 2B:
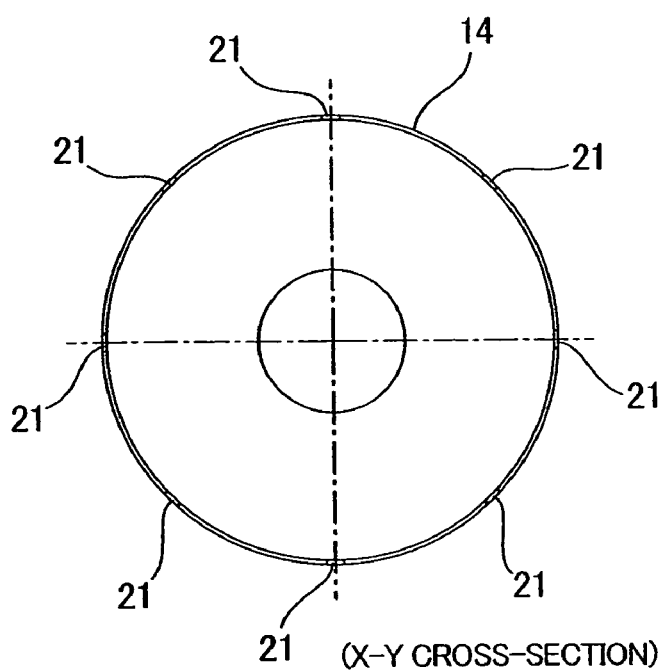

FIGS. 2A and 2B are a longitudinal sectional view showing the cup-shaped flexible externally toothed gear, and a cross sectional view along line X-Y. A lubricating mechanism of the wave reduction gear 5 will be described with reference to these drawings.

Oil supply holes 21 are formed at a fixed angular interval in a circumferential direction in the boundary portion between the cylindrical trunk part 14 and the external teeth 17 of the flexible externally toothed gear 12. For example, eight oil supply holes 21 are formed at a 45 degree angular interval. A single oil supply channel 22 is formed in the device case 2 in order to supply lubricating oil into the internal space 7 from the exterior. An inner opening 22a of the oil supply channel 22 faces the positions in which the oil supply holes 21 are formed in the flexible externally toothed gear 12. The oil supply channel extends linearly from the inner opening in a direction perpendicular to the center axis line 1a. An external opening 22b of the oil supply channel is exposed on the outer peripheral surface of the device case 2. A plurality of oil supply channels 22 may also be formed.

An inner opening 23a of an oil recovery channel 23 is formed in a portion of the inner peripheral surface of the device case 2 that is below the location in which the internal teeth 11 and the external teeth 17 mesh. The inner opening 23a is positioned opposite the inner opening 22a of the oil supply channel 22, across the center axis line 1a as the center. The oil recovery channel 23 extends from the inner opening 23a in a direction perpendicular to the center axis line 1a, and then bends downward at a right angle. The outer opening 23b of the oil recovery channel is exposed on the lower end surface of the device case 2. A plurality of oil recovery channels 23 can also be formed.

Lubricating oil is fed under pressure to the oil supply channel 22 from an external lubricating oil supply source. The oil recovery channel 23 communicates with a suction port of a suction pump (not shown) for recovering the lubricating oil. The lubricating oil is forcibly suctioned and recovered via the oil recovery channel 23.

The lubricating oil supplied from the lubricating oil supply source to the oil supply channel 22 is sprayed into the interior from the inner opening 22a of the oil supply channel 22. The sprayed lubricating oil is sprayed onto the locations where the oil supply holes 21 are formed in the flexible externally toothed gear 12. As a result, a portion of the sprayed lubricating oil enters the flexible externally toothed gear 12 from the oil supply holes 21. The lubricating oil that has entered lubricates components of the wave bearing 19 of the wave generator 13. Lubricating oil that has not entered the oil supply hole 21 is supplied to the meshed portions of the internal teeth 11 and the external teeth 17, and these portions are lubricated.

The lubricating oil is forcibly suctioned by a suction pump (not shown) via the oil recovery channel 23. Therefore, lubricating oil that has entered the flexible externally toothed gear 12 is forcibly suctioned toward the open end of the flexible externally toothed gear 12 via the components of the wave bearing 19 in the wave generator 13. Similarly, lubricating oil that has been supplied to the meshed portions of the internal teeth 11 and the external teeth 17 is also forcibly suctioned towards the open end of the flexible externally toothed gear 12 via these portions. The lubricating oil that is suctioned below the open end is recovered to the exterior via the oil recovery channel 23.

The lubricating oil is thus forcibly supplied to the interior via the oil supply holes 21 formed in the flexible externally toothed gear 12, and components of the wave bearing 19 are lubricated. The lubricating oil that has been supplied to the interior is forcibly suctioned, and is recovered toward the open end of the flexible externally toothed gear 12 from the interior thereof. Therefore, lubricating oil can be prevented from being suctioned by negative pressure inside the flexible externally toothed gear 12. Furthermore, lubricating oil can be reliably supplied to the meshed portions.

In addition, forcibly circulating the lubricating oil makes it possible to flush out and discharge foreign matter such as powder generated as a result of initial wear from components of the mechanism on startup. Accordingly, it is possible to reliably prevent damage to sliding components, bearing components, and other components of the wave reduction gear caused by the powder formed as a result of wear.

The lubrication method of the present invention can also be used in a case in which a wave reduction gear is used in a machine tool other than a rotating table device. The oil supply holes 21 are formed in the cylindrical trunk part 14 of the flexible externally toothed gear 12, but the oil supply holes may also be formed in the diaphragm 15.

Embodiment 2

Figure 3:
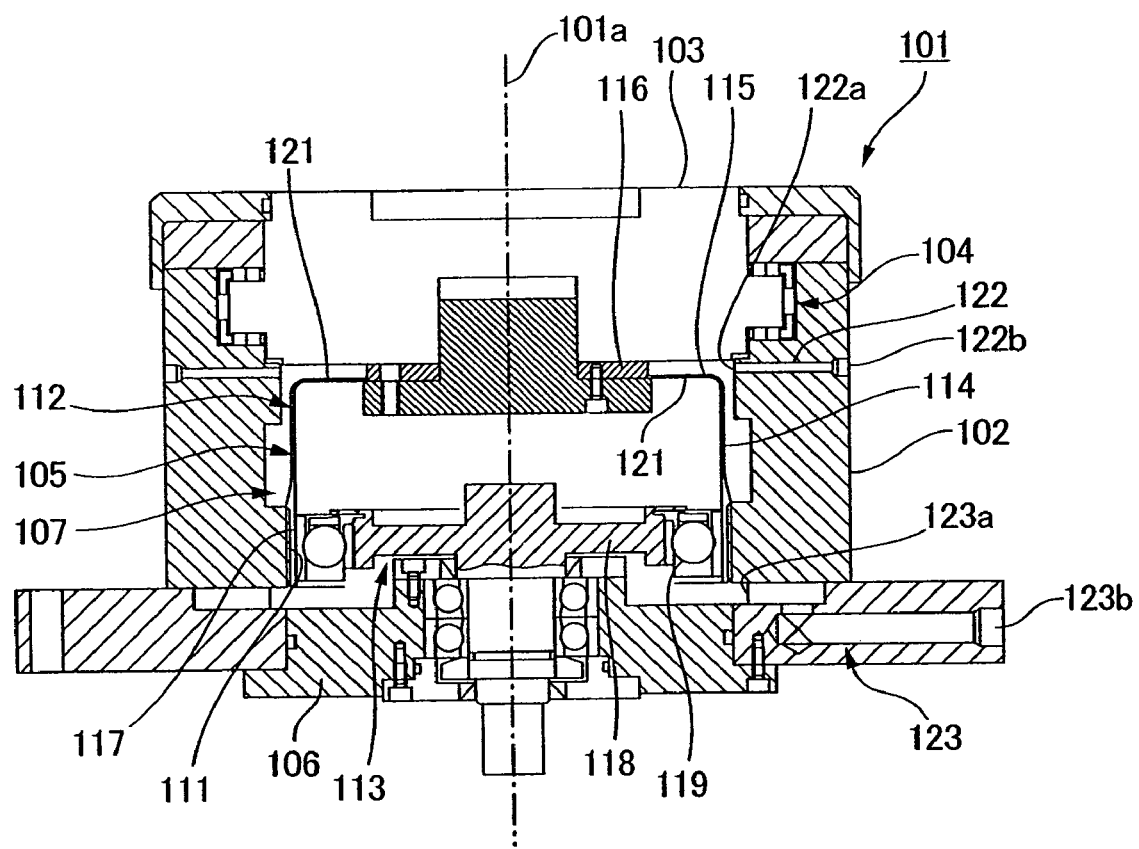
FIG. 3 is longitudinal sectional view showing a rotating table device according to Embodiment 2 of the present invention.
Figure 4A:
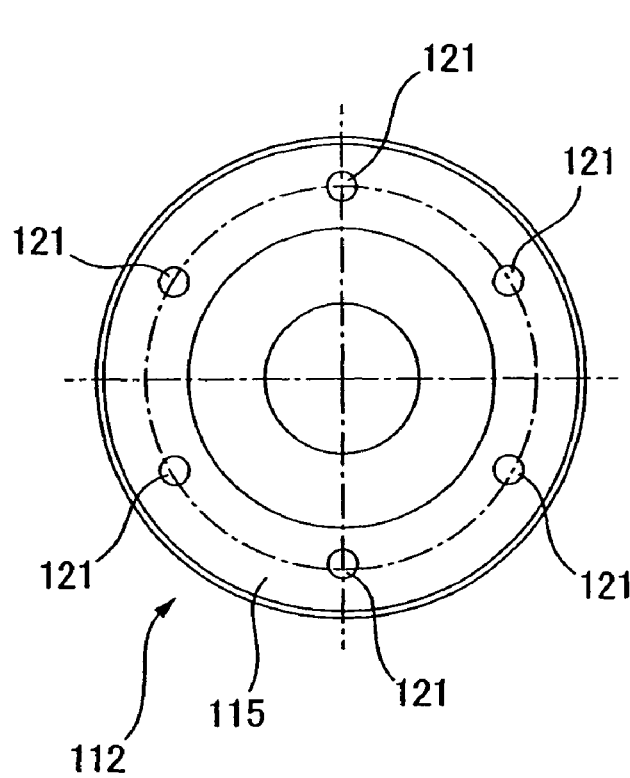
FIGS. 4A and 4B are a front view and a longitudinal sectional view of the flexible externally toothed gear of the wave reduction gear installed in the rotating table device in FIG. 3.
Figure 4B:
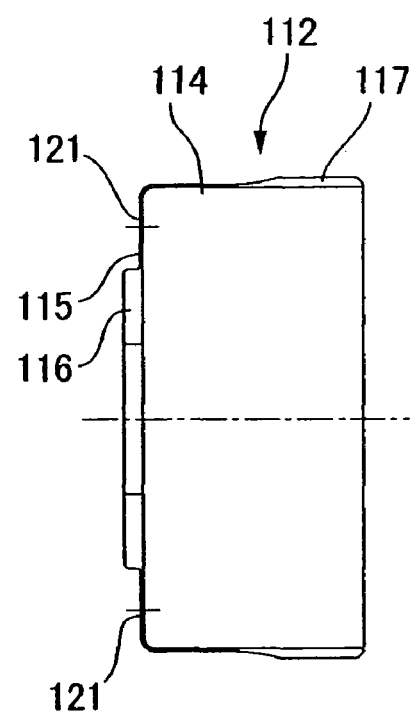

FIG. 3 is longitudinal sectional view showing a rotating table device according to Embodiment 2 in which the present invention is applied. FIGS. 4A and 4B are a front view and a longitudinal sectional view of the cup-shaped flexible externally toothed gear.

The rotating table device 101 of Embodiment 2 has substantially the same structure as the rotating table device 1 of Embodiment 1. Specifically, the rotating table device 101 has a device case 102; a rotating table 103 that is rotatably supported in a coaxial state on top of the device case; a bearing mechanism 104 disposed between the device case 102 and the rotating table 103 in order to rotatably support the rotating table on the device case; and a wave reduction gear 105 for rotating and driving the rotating table 103 around a center axis line 101a. The wave reduction gear 105 is connected to a motor or another such rotation drive source (not shown).

The device case 102 has a cylindrical shape and has openings in upper and lower ends. The upper end opening part is sealed off by the rotating table 103, and the lower end opening part is sealed off by a disc-shaped flange 106. The cup-shaped wave reduction gear 105 is disposed in a state facing the vertical direction in an internal space 107, which is enclosed by the device case 102, the rotating table 103, and the disc-shaped flange 106.

The wave reduction gear 105 comprises internal teeth 111 integrally formed with the device case 102; a cup-shaped flexible externally toothed gear 112; and a wave generator 113. The flexible externally toothed gear 112 has a cylindrical trunk part 114; a diaphragm 115 that is connected to an upper end of the cylindrical trunk part and that widens toward the interior in the radial direction; an annular boss 116 which is connected to an inner peripheral edge of the diaphragm 115; and external teeth 117 formed in the external surface portion of the upper opening part of the cylindrical trunk part 114.

The wave generator 113 has, e.g., a rigid cam plate 118 whose outline forms an ellipse; and a wave bearing 119 installed on the outer peripheral surface of the rigid cam plate. The wave bearing 119 is a ball bearing comprising a flexible outer race and inner race. The wave generator 113 is fitted in the flexible externally toothed gear 112 so as to seal off the open end of the flexible externally toothed gear 112.

The lubricating mechanism of the wave reduction gear 105 has the following structure. Oil supply holes 121 are formed concentrically at fixed angular interval in the diaphragm 115 of the flexible externally toothed gear 112. For example, six oil supply holes 121 are formed at 60 degree angular intervals. A single oil supply channel 122 is formed in the device case 102 in order to supply lubricating oil into the internal space 107 from the exterior. An inner opening 122a of the oil supply channel 122 is positioned away from the diaphragm 115 in the flexible externally toothed gear 112. The oil supply channel extends linearly from the inner opening in a direction perpendicular to the center axis line 101a. An external opening 122b of the oil supply channel is exposed on the outer peripheral surface of the device case 102.

An inner opening 123a of an oil recovery channel 123 is formed in a portion of the inner peripheral surface of the device case 102 that is below the portions where the internal teeth 111 and the external teeth 117 mesh. The inner opening 123a is positioned on the same side as the center axis line 101a, with respect to the inner opening 122a of the oil supply channel 122. The oil recovery channel 123 extends from the inner opening 123a in a direction perpendicular to the center axis line 101a, bends downward at a right angle, and then again extends in the direction perpendicular to the center axis line 101a. The outer opening 123b of the oil recovery channel is exposed on the outer peripheral surface of a large-diameter flange 102a formed on the lower end of the device case 102. A plurality of oil supply channels 122 and oil recovery channels 123 can also be formed.

Lubricating oil is fed under pressure to the oil supply channel 122 from an external lubricating oil supply source. The oil recovery channel 123 communicates with a suction port of a suction pump (not shown) for recovering the lubricating oil. The lubricating oil is forcibly suctioned and recovered via the oil recovery channel 123.

The lubricating oil supplied from the lubricating oil supply source to the oil supply channel 122 is sprayed into the interior from the inner opening 122a of the oil supply channel 122. The sprayed lubricating oil is sprayed onto the locations where the oil supply holes 121 are formed in the flexible externally toothed gear 112. As a result, a portion of the sprayed lubricating oil enters into the flexible externally toothed gear 112 from the oil supply holes 121. The lubricating oil that has penetrated to the interior lubricates components of the wave bearing 119 of the wave generator 113. Lubricating oil that has not entered the oil supply hole 121 is supplied to the meshed portions of the internal teeth 111 and the external teeth 117, and these portions are lubricated.

The lubricating oil is forcibly suctioned by a suction pump (not shown) via the oil recovery channel 123. Therefore, lubricating oil that has entered into the flexible externally toothed gear 112 is forcibly suctioned toward the open end of the flexible externally toothed gear 112 via the components of the wave bearing 119 in the wave generator 113. Similarly, lubricating oil that has been supplied to the enmeshed portions of the internal teeth 111 and the external teeth 117 is also forcibly suctioned towards the open end of the flexible externally toothed gear 112 via these portions. The lubricating oil that is suctioned below the open end is recovered to the exterior via the oil recovery channel 123.

The lubricating oil is thus forcibly supplied to the interior via the oil supply hole 121 formed in the flexible externally toothed gear 112, and components of the wave bearing 119 are lubricated. The lubricating oil that has been supplied to the interior is forcibly suctioned, and is recovered toward the open end of the flexible externally toothed gear 112 from the interior thereof. Therefore, lubricating oil can be prevented from being suctioned by negative pressure inside the flexible externally toothed gear 112. Furthermore, lubricating oil can be reliably supplied to the meshed portions. In addition, forcibly circulating the lubricating oil makes it possible to possible to flush out and discharge foreign matter such as powder generated as a result of initial wear from components of the mechanism on startup. Accordingly, it is possible to reliably prevent damage to sliding components, bearing components, and other components of the wave reduction gear caused by the powder produced as a result of wear.

The lubrication method of the present example can also be used in a case in which a wave reduction gear is used in a machine tool other than a rotating table device.

The invention claimed is:

1. A method for lubricating a wave reduction gear, wherein lubricating oil is supplied to bearing components of a wave generator fitted inside a cup-shaped flexible externally toothed gear in a wave reduction gear disposed in a device case, and portions where the flexible externally toothed gear and a rigid internally toothed gear are enmeshed; wherein the lubricating method is characterized in comprising:
   forming at least one oil supply hole in a region of at least one of a cylindrical trunk part of the flexible externally toothed gear, and a diaphragm that defines a bottom part thereof;
   spraying lubricating oil, which has been introduced from exterior of the device case, toward the region of the flexible externally toothed gear in which the lubricating oil supply hole is formed;
   forcibly introducing lubricating oil into the flexible externally toothed gear via the oil supply hole; and
   supplying the lubricating oil that has been forcibly introduced into the flexible externally toothed gear to the bearing components of the wave generator that is fitted in an open end part of the flexible externally toothed gear.

2. The method for lubricating a wave reduction gear according to claim 1; characterized in comprising:
   forcibly suctioning the lubricating oil introduced into the device case toward the open end of the flexible externally toothed gear;
   forcibly supplying the lubricating oil in the flexible externally toothed gear to the bearing components of the wave generator, and forcibly supplying lubricating oil, which has not entered the flexible externally toothed gear, from the oil supply hole to the enmeshed portions of the flexible externally toothed gear and the rigid internally toothed gear; and
   recovering to the exterior of the device case lubricating oil that has been forcibly suctioned through the bearing components and the meshing portions.

3. A flexible externally toothed gear in a wave reduction gear used in the lubrication method of claim 1; characterized in comprising:
   a cylindrical trunk part; a diaphragm that extends from one end of the cylindrical trunk part inward in a radial direction; and external teeth formed in an outer peripheral surface portion of the other open end of the cylindrical trunk part; wherein
   at least one through-hole used for supplying oil is formed in a region of at least one of the cylindrical trunk part and the diaphragm.

4. A rotating table device, characterized in comprising:
   a device case;
   a rotating table rotatably supported on the device case; and
   a wave gear device, which rotates and drives the rotating table, and which is disposed in an interior space enclosed by the device case and the rotating table; wherein
   the wave gear device has a rigid internally toothed gear, which is fixed to the drive case; a cup-shaped flexible externally toothed gear, which is coaxially connected to the rotating table; and a wave generator, which is fitted in an open end part of the flexible externally toothed gear;
   the flexible externally toothed gear has at least one oil supply hole formed in a region of at least one of a cylindrical trunk part of the flexible gear, and a diaphragm that defines a bottom surface portion of the flexible gear; and
   the device case has an oil supply channel for introducing lubricating oil from the exterior of the device case, and spraying the lubricating oil toward the region of the flexible externally toothed gear in which the oil supply hole is formed; and an oil recovery channel for forcibly suctioning the lubricating oil toward the open end of the flexible externally toothed gear, and recovering the lubricating oil to the exterior of the device case.

* * * * *